UNITED STATES PATENT OFFICE.

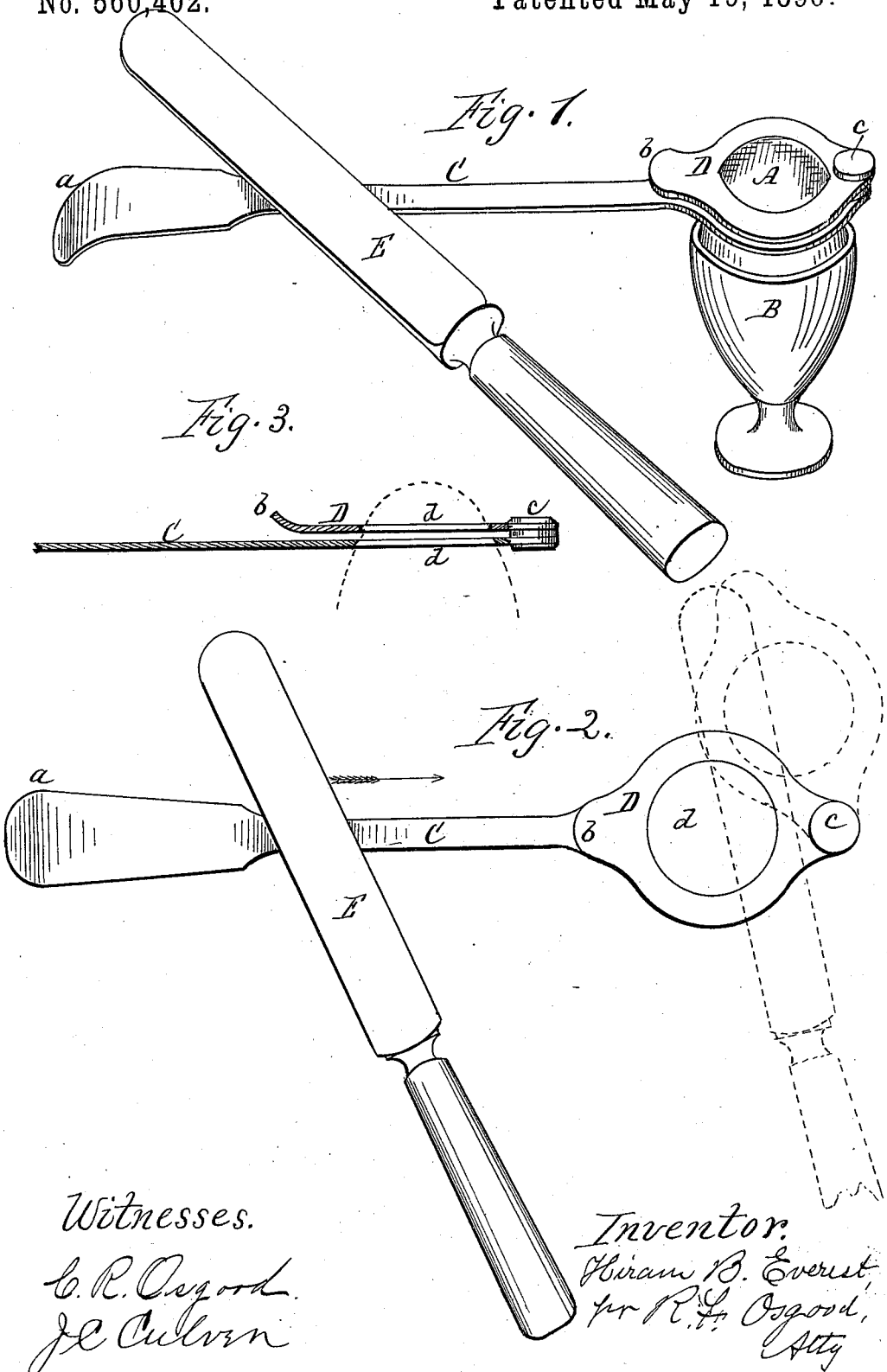

HIRAM B. EVEREST, OF RIVERSIDE, CALIFORNIA.

EGG-CUTTER GUIDE AND HOLDER.

SPECIFICATION forming part of Letters Patent No. 560,402, dated May 19, 1896.

Application filed August 26, 1895. Serial No. 560,484. (No model.)

*To all whom it may concern:*

Be it known that I, HIRAM B. EVEREST, of Riverside, in the county of Riverside and State of California, have invented a certain new and useful Improvement in Egg-Cutter Guides and Holders; and I do hereby declare that the following is a full, clear, and exact description of the same, reference being had to the drawings accompanying this application.

My improvement relates to that class of egg-cutting devices in which the egg is placed in a cup and the top is severed by a knife which sweeps across it at right angles. Such devices are well known. In ordinary devices of the class the knife or cutter is attached by a pivot, or else is loosely attached and acts against a fulcrum to produce the cutting action. In either case it has short radius and but small movement. An egg has a thin skin or membrane inside the shell which is very tenacious, especially when the egg is cooked, and as the shell is brittle the egg is liable to be crushed by such movement and small pieces of the shell will be mixed with the contents. To obviate this difficulty, the knife in my device is caused to have a long stroke and considerable power, in which case when it strikes the egg a clean cut is made, and the shell is substantially unbroken around the edges when it is severed.

My invention consists in a device of peculiar construction for accomplishing this result, as hereinafter described, and embodied in the claim.

In the drawings, Figure 1 is a perspective view of the device with the knife in position to give the stroke. Fig. 2 is a plan view of the same. Fig. 3 is an edge view partially in section.

The egg A is placed in a cup B, preferably the small end upward. The holder and guide consists of two members or parts C and D. The part C is a long straight handle similar in form to a spoon-handle, the outer end $a$ being preferably turned downward, as shown, forming a handhold. Said part C forms the guide for an ordinary table-knife E, which constitutes the cutter. The other part D of the holder is simply a socket-piece with its outer end $b$ curved upward to facilitate the entrance of the knife between the parts in making the stroke. These parts are pivoted together at $c$, so that the upper part D can be swung off to one side, as indicated by the dotted lines in Fig. 2, or it can be swung back in a straight line with the part C, in which case both parts are extended in one length to facilitate washing. Both parts are enlarged at this end and are provided with coincident openings $d$ $d$, which fit over the upper end of the egg, the lower one holding it down in the cup while the cut is being made. The opening in the bottom member C is beveled to fit the incline of the egg, while that in the upper part is square-edged and the opening is made a little smaller than that in the bottom member, but not quite touching the egg, by which means it prevents the top of the egg from being thrown off after being severed. The two members or parts are situated at such a distance apart that the knife has free passage through between them as far back as the pivot.

When the holder is to be used, it is fitted over the egg, the long handle extending outward horizontally and being held between the fingers of the operator. The knife E is then laid across the handle at the outer end, as shown in full lines. A quick stroke is given to the knife, the top of the handle forming a guide to the same, and the knife entering between the two parts is held firmly in position and the egg is severed with a clean cut, the upper part being held by the contracted opening of the upper member, as before described. The full and dotted lines in Fig. 2 show the two positions of the knife.

The important feature in this invention is the long handle C, extended outward horizontally and forming an open guide on which a free knife can be placed and be given a long stroke to sever the egg with a quick blow. By this means a clean cut is made, leaving the edges of the shell substantially unbroken and without being fractured and mixed with the interior of the egg. This long handle also facilitates the handling of the device.

Having described my invention, I do not claim, simply and broadly, an egg-holder consisting of two members having sockets to fit the egg, nor do I claim, broadly, a cutter for severing the egg.

What I claim as new, and desire to secure by Letters Patent, is—

The improved egg-cutting guide herein described, the same consisting of a handle member having near one end a transverse opening of proper size to fit an egg at the desired cutting-point, another and shorter member extending over and slightly above the handle member and parallel with it, such upper or shorter member having also a transverse opening which is of smaller size than that in the handle member but not small enough to touch the egg, and a pivotal connection between said members at the side of said openings remote from the handle, the latter being flat on its entire upper surface to permit the clear stroke of a knife, as and for the purpose herein set forth.

In witness whereof I have hereunto signed my name in the presence of two subscribing witnesses.

HIRAM B. EVEREST.

Witnesses:
R. F. OSGOOD,
GEO. A. GILLETTE.